Patented Oct. 7, 1952

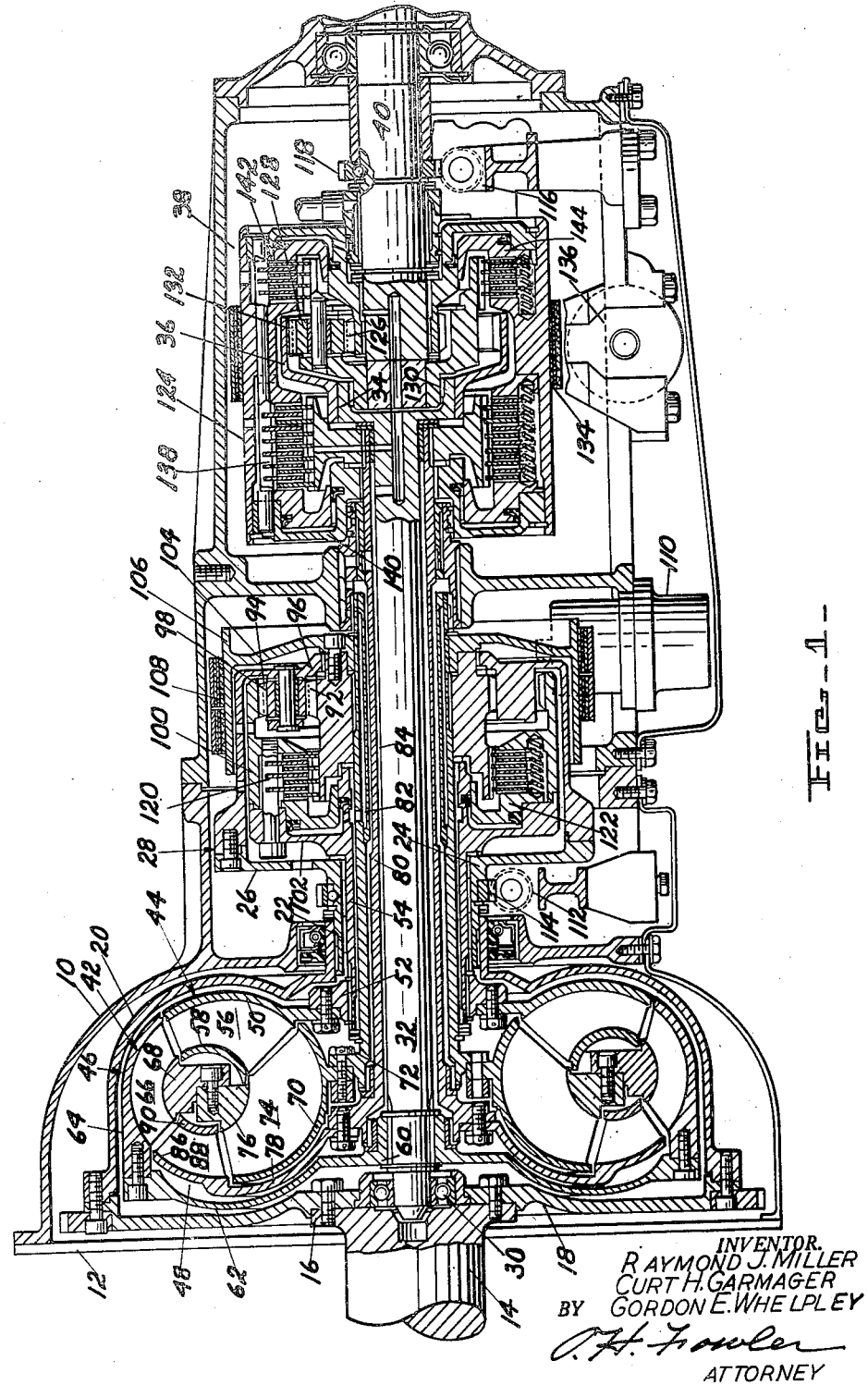

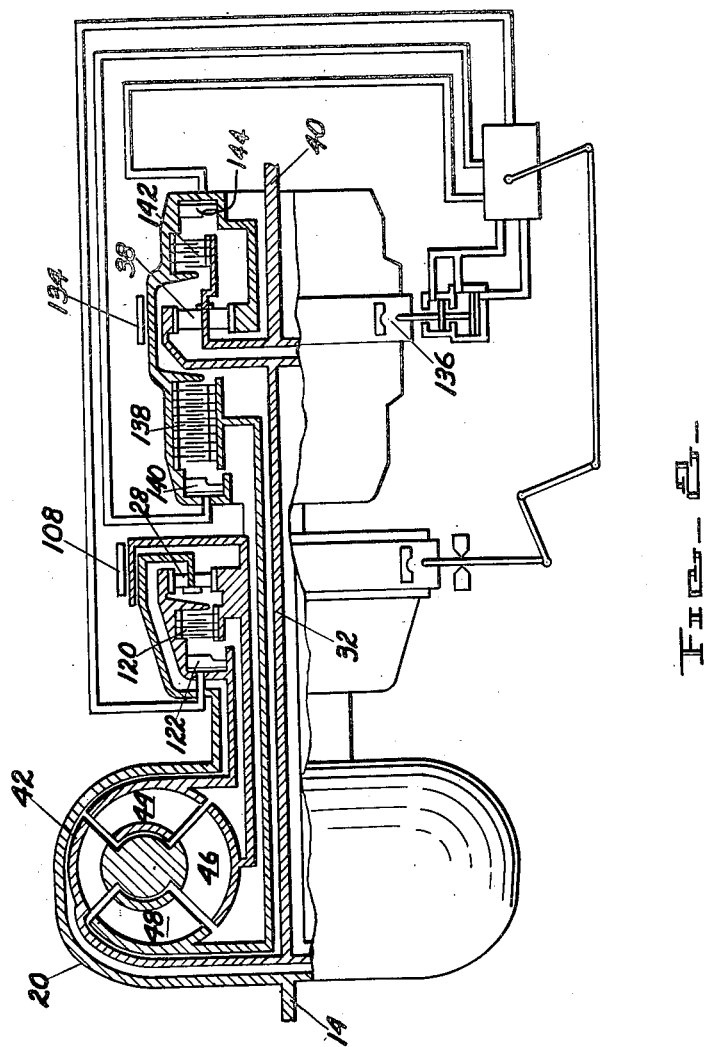

2,612,791

UNITED STATES PATENT OFFICE 2,612,791

TRANSMISSION

Raymond J. Miller, Curt H. Garmager, and Gordon E. Whelpley, Detroit, Mich., assignors to Bendix Aviation Corporation, Detroit, Mich., a corporation of Delaware Application November 28, 1947, Serial No. 788,388

8 Claims. (Cl. 74—677)

This invention relates to transmissions.

Broadly the invention comprehends an infinitely variable transmission including a hydrodynamic structure combined with a plurality of planetary gear systems.

An object of the invention is to provide an automatically operative transmission in which the transition from one stage of operation to another may be effected smoothly so as to avoid shock with the resultant injurious effect on the transmission.

Another object of the invention is to combine a hydro-dynamic structure having a two-path power flow with planetary gear systems so as to provide a transmission that will quickly pick up a load and will automatically shift to various stages of operation as a result of changes in speed and torque demand.

Another object of the invention is to provide a transmission comprising a fluid torque converter combined with planetary gear systems and to effectively couple the respective elements of the converter to the planetary gear systems so as to render the transmission fully automatic in its operations.

A further object of the invention is to provide a transmission including a torque converter and two planetary gear systems arranged coaxially with relation to one another, the driving element of the converter being connected to the forward planetary gear system, the driven element of the converter being connected to both planetary gear systems and the reaction element being detachably connected to the rear planetary gear system.

Yet a further object of the invention is to provide a transmission including an input structure, a fluid torque converter, planetary gear systems and an output structure so arranged and connected that the reaction element of the converter may function as a brake to retard rotation of the output structure.

Other objects and advantages of the invention will appear from the following description when taken in connection with the drawings forming a part of this specification, and in which:

Fig. 1 is a longitudinal sectional view of a transmission embodying the invention, and Fig. 2 is a diagrammatical illustration of the transmission.

Referring to the drawings for more specific details of the invention, 10 indicates a bell housing fixedly supported on a plate 12 adapted to be secured to the block of an internal combustion engine having a crank shaft 14 extended through the plate 12 into the bell housing 10 in concentric relation thereto, and a flange 16 on the shaft has secured thereto a hub 18, supporting a rotatable housing 20 having a hub 22 oppositely and concentrically disposed with relation to the hub 18, and a sleeve 24 splined to the hub 22 has a peripheral flange 26 connected to a planetary gear system indicated generally at 28.

The hub 18 has therein a bearing 30 supporting one end of a driving shaft 32. The shaft extends through the housing 20 and the sleeve 24 splined to the hub 22 and has on its other end a hub 34 carrying a flange 36 connected to a planetary gearing system indicated generally at 38, and the hub 34 has therein a bearing supporting a driven shaft 40 also journalled in a suitable bearing on the housing 10.

The housing 20 encloses a fluid torque converter indicated generally at 42. As shown, the torque converter includes a driving element or an impeller 44, a driven element preferably a two-stage turbine 46 and a reaction member 48 cooperating with one another to provide a toroidal fluid circuit.

The impeller 44 includes a shroud 50 bolted or otherwise secured to a hub 52 splined on a tubular shaft 54 journaled on suitable bearings in the sleeve 24, and the shroud 50 has thereon equi-spaced blades 56 supporting an inner shroud 58.

The turbine 46 includes a hub 60 splined to the driving shaft 32. The hub has a flange 62 supporting an outer shroud 64 having thereon equi-spaced vanes 66 supporting an inner shroud 68. This structure constitutes the first stage of the turbine and the second stage of the turbine includes an outer shroud 70 bolted or otherwise secured to a tubular shaft 72 extended through the tubular shaft 54 and journaled on suitable bearings therein, and the shroud 70 has arranged thereon equi-spaced vanes 74 supporting an inner shroud 76 suitably secured to the inner shroud 68 of the first stage of the turbine.

The reaction member 48 includes a flange 78 bolted or otherwise secured to a tubular shaft 80 extended through the shaft 72 and supported on suitable bearings therein and in spaced relation to the shaft 72 and the driving shaft 32, so as to provide fluid passages 82 and 84 for the circulation of fluid. The flange 78 supports an outer shroud 86 and equi-spaced vanes 88, arranged on the shroud 86 support an inner shroud 90 for cooperation with the inner shrouds of the impeller and the turbine.

The planetary gear system 28 includes a sun gear 92 splined to and driven by the shaft 72 fixedly connected to the turbine 64. The sun gear 92 is in mesh with planet pinions 94 mounted for rotation on a suitable carrier 96 fixedly connected to the hub 22 of the rotatable housing 20 as by the sleeve 24 and flange 26, and a ring or orbit gear 98 in mesh with the planet pinions 94 is carried on a drum 100 fixedly secured to a flange 102 on the shaft 54 supporting the impeller 14.

The planetary gear system 28 is hydraulically controlled. As shown, a flange 104 splined to the shaft 72 carrying the sun gear 92, supports a drum 106, and a friction band 108 for cooperation with the drum is controlled as by fluid pressure actuated unit 110 connected in the fluid pressure system, supplied as by a pump 112 driven by the gear 114 on the sleeve 24 connected to a prime mover and by a pump 116 driven by the gear 118 on the driven shaft 40. The planetary gear system 28 is also controlled as by a clutch 120 having its cooperative elements connected to the sun gear 92 and the orbit gear 98 respectively, and a fluid pressure actuated unit 122 connected in the fluid pressure system serves to control the clutch.

The planetary gear system 38 includes a drum or housing 124 supported for rotation on suitable bearings fitted on the driven shaft 40 and the shaft 80 carrying the reaction member 48, and a sun gear 126 carried by the drum meshes with planet pinions 128 mounted for rotation on a carrier 130 splined or otherwise secured to the driven shaft 40, and the planet pinions mesh with a ring or orbit gear 132 carried on the flange 36 of the driving shaft 32.

The planetary gear system 38 is controlled by a brake operative to hold the sun gear 126. The brake includes a friction element 134 controlled by a fluid actuated unit 136 connected in the fluid pressure system. The planetary gear system 38 is also controlled by a clutch 138 operative to lock the sun gear 126 to the reaction member 48. The clutch 138 includes cooperative elements carried by the shaft 80 connected to the reaction member 48 and the drum 124 respectively, and the clutch is under control of a fluid pressure unit 140 connected in the fluid pressure system. The planetary gear system 38 is further controlled by a clutch 142 operative to lock the sun gear 126 and the carrier 130 of the planet pinions 132 together, and the clutch 142 includes cooperative elements carried by the drum 124 supporting the sun gear 126 and the carrier 130 for the planet pinions.

In the structure hereinabove described in detail, a fluid torque converter including an impeller 44, a two-stage turbine 46 and a reaction member 48 has a planetary gear system 28 arranged for operation before the converter and a planetary gear system 38 arranged for operation after the converter.

When in neutral position power from a prime mover of the internal combustion engine is impressed through the rotatable housing 20, the sleeve 24, and the flange 26 on the carrier 96 of the planet pinions 94. The power transmitted to the planet pinions is split so that part is transmitted to the sun gear 92 and the remainder to the orbit gear 98. That portion of the power transmitted to the sun gear 92 flows therefrom through the shaft 72 direct to the turbine 46 and that portion of the power transmitted to the orbit gear 98 flows therefrom through the drum 100, the flange 102 and the shaft 54 to the impeller 44 causing rotation thereof with the resultant energization of fluid in the circuit and the transmission of power through the medium of the fluid from the impeller to the turbine. The reaction member 48 is free to float in the circuit, hence in this instance the torque converter 42 functions as a fluid coupling. There is a two-path flow of power from the planetary gear system 28 to the turbine 46 and the power received by the turbine is transmitted therefrom through the flange 36 on the shaft 32 to the orbit gear 132 of the planetary gear system 38 which idles during this stage.

When it is desired to move forward, the brake 134 and the clutch 138 are applied due to increase of pressure on the fluid in the system. This results in holding the sun gear 126 and locking the reaction member 48 thereto. Under this condition power impressed by the prime mover on the planetary gear system 28 is split thereby so that part of the power flows direct from the sun gear 92 to the turbine and the remainder from the orbit gear to the impeller 44, from which it is transmitted through the medium of the fluid in the circuit to the turbine and to the reaction member which, in this instance, is held against movement so that the torque converter may operate with torque multiplication, and the power received by the turbine is transmitted therefrom through the shaft 32 to the planetary gear system 38, where the torque is again multiplied and transmitted to the driven shaft.

Upon increase in speed to the extent that the torque converter no longer multiplies the torque, the clutch 120 is automatically applied due to increased pressure on the fluid in the system to lock the planetary gear system 28 for rotation as a single unit connecting the impeller and turbine directly to the prime mover, and simultaneously therewith the clutch 138 due to decrease of pressure in the fluid pressure actuated unit 140 is automatically released so that the reaction member may run free. Under this condition, the brake 134 being still applied, the torque of the prime mover is transmitted directly through the planetary gearing system 38 with torque multiplication to the driven shaft 40.

Upon further increase in speed to the extent where torque demand decreases, the pressure on the fluid in the fluid pressure actuated unit 136 decreases and the brake 134 is automatically released. The clutch 142 due to increase of pressure in the fluid pressure actuated unit 144 is simultaneously and automatically applied so as to synchronize the prime mover with the driven shaft 40 and the clutch 138 is automatically applied by the fluid actuated unit 140 so that all of the moving parts of the transmission may rotate at the same speed so as to reduce drag.

Upon a material decrease in speed the transmission automatically returns to the first stage of the forward drive wherein the torque converter 42 again comes into operation, except that the clutch 138 is released to the end that the reaction member 48 free wheels so that the torque converter 42 may function as a fluid coupling. Under this condition the torque output of the turbine unit is reduced to that of the prime mover when idling, multiplied only by the planetary gear system 38 coupled between the driving and driven shafts.

To effect a braking operation, the fluid pressure system is actuated so as to return the transmission to its second phase of forward drive wherein the planetary gear system 28 is locked for rotation as a single unit and serves to couple the impeller and the turbine to the prime mover. While in this stage of operation the clutch 138 is applied to hold the reaction member against movement, and under this condition torque, due to forward rotation of the rear wheels, is absorbed by the reaction member 48 resisting rotation of the impeller and the turbine through the medium of the fluid in the vortex chamber and by the prime mover to effectively resist forward rotation of the wheels.

To effect a reverse drive the brake 108 is manually applied so as to hold the turbine stationary. The clutch 120, the brake 134 and the clutch 142 are automatically released because of decreased pressure in the accompanying fluid pressure actuated units 122 and 144 and the clutch 138 is automatically applied by increased pressure in the fluid pressure actuated unit 140 to lock the reaction member 48 to the sun gear 126 of the planetary gear system 38. Under this condition power from the prime mover impressed on the planetary gear system 28 flows therefrom to the impeller 44, causing rotation thereof with the resultant energization of the fluid in the vortex chamber and the energy of the fluid is received by the reaction member causing the member to rotate in the reverse direction and the power received by the reaction member is transmitted therefrom through the shaft 80, the clutch 138, the drum 124 to the sun gear 126 and through the planet pinions 128 to the driven shaft 40, causing the shaft to rotate in the reverse direction.

In instances where it is desired to start the prime mover as by towing, shift is made as in the first stage of forward drive. When in this position upon rotation of the driven shaft 40, the clutch 120 is applied due to increased pressure in the fluid pressure unit 122 to lock the planetary gear system 28 for rotation as a single unit serving to connect the impeller and turbine to the prime mover, the clutch 138 due to increased pressure in the pressure actuated unit 140 is applied so as to lock the reaction member 48 to the sun gear 126 of the planetary gear system 38 and the clutch 142 due to increase of pressure in the pressure actuated unit 144 is applied to lock the planet pinions 128 of the planetary gear system 38. Under this condition power flows from the driven shaft through the planetary gear system 38, thence through the drive shaft 32 through the turbine and impeller to the planetary gear system 28 and then to the prime mover.

While this invention has been described in connection with certain specific embodiments, the principle involved is susceptible of numerous other application that will readily occur to persons skilled in the art.

Having thus described the various features of the invention, what we claim as new and desire to secure by Letters Patent is:

1. A variable speed transmission comprising an input structure, driving, driven and reaction elements cooperating with one another and providing a vortex chamber for the circulation of fluid, a power splitting differential connected to the input structure, means directly connecting the power splitting differential to the driven element, means connecting the power splitting differential to the driving element for the transmission of power through the medium of the fluid in the vortex chamber to the driven element, means for locking the power splitting differential for operation of the driving and driven elements as a single unit, a brake for the power splitting differential for holding the turbine and utilizing the reaction element as a driven element for effecting reverse drive, a driving shaft connected to the driven element, a driven shaft, power multiplying gear connected between the driving and driven shafts, means for connecting the reaction element to the power multiplying gear, a brake for holding one element of the power multiplying gear to effect torque multiplication and means for locking the power multiplying gear for rotation as a single unit.

2. A variable speed transmission comprising a power input shaft, a housing connected thereto for rotation therewith, a fluid torque converter including an impeller, a turbine and a reaction member in the housing, a first planetary gear system including a sun gear, planet pinions and an orbit gear, means connecting the planet pinions to the housing, means connecting the orbit gear to the impeller, means connecting the sun gear to the turbine, means for locking the sun gear to the orbit gear for rotation as a single unit, a driving shaft connected to the turbine, an output shaft, a second planetary gear system connected between the driving shaft and the output shaft, the second planetary gear system including a sun gear, a carrier on the output shaft, planet pinions on the carrier and an orbit gear on the driving shaft, a clutch for connecting the reaction member to the sun gear of the second planetary system, a brake for holding the sun gear of the second planetary gear system to effect torque multiplication, and means for locking together the sun gear and the carrier of the second planetary gear system for rotation as a single unit.

3. A variable speed transmission comprising an input shaft, a housing connected thereto for rotation therewith, a fluid torque converter including an impeller, a turbine and a reaction member arranged for cooperation with one another within the housing, a planetary gear system including a sun gear, planet pinions and an orbit gear, means connecting the pinions to the housing, means connecting the orbit gear to the impeller, means connecting the sun gear to the turbine, fluid pressure actuated means for locking the planetary gear system, a fluid actuated brake for the sun gear, a driving shaft connected to the turbine, an output shaft, a planetary gear system connecting the driving shaft to the output shaft, a fluid pressure actuated clutch for connecting the reaction member to the sun gear of the last mentioned planetary gear system, a brake for holding the sun gear of the last mentioned planetary gear system, and a fluid actuated clutch for locking together the sun gear and pinions of the last mentioned planetary gear system.

4. A variable speed transmission comprising power input structure, cooperative driving, driven and reaction elements providing in conjunction with one another a chamber for the circulation of fluid, a power splitting differential connected to the input structure and operative to transmit part of the power directly to the driven element and the remainder to the driving element for transmission therefrom through the medium of the fluid to the driven element with torque multiplication, means for locking the power splitting differential so as to drive the driving and driven elements as a single unit, a driving shaft connected to the driven element, a driven shaft, torque multiplying means coupled between the shafts, a clutch for connecting the reaction element to the torque multiplying means, and means for locking the torque multiplying means to effect a direct drive between the shafts.

5. A variable speed transmission comprising a power input structure, cooperative driving, driven and reaction elements providing in conjunction with one another a vortex chamber for the circulation of fluid, a power splitting differential connected to the power input structure and adapted to transmit part of the power to the driven element and the remainder to the driving element for transmission through the medium of the fluid to the driven element, said power splitting differential including a sun gear connected to the driven element, a carrier connected to the input structure, planet pinions on the carrier and an orbit gear connected to the driving element, means for locking together the sun gear and the orbit gear of the power splitting differential for rotation as a single unit, a driving shaft connected to the driven element, a driven shaft, torque multiplying means coupled between the driving and driven shafts and including a sun gear, a carrier connected to the driven shaft, planet pinions on the carrier and an orbit gear connected to the driving shaft, fluid pressure actuated means for connecting the reaction element to the sun gear of the torque multiplying means, and fluid pressure actuated means for locking together the sun gear and the carrier for the planet pinions of the torque multiplying means.

6. A variable speed transmission comprising a power input structure, cooperative driving, driven and reaction elements, a power splitting differential including a sun gear connected to the driven element, a carrier connected to the power input structure, planet pinions on the carrier and an orbit gear connected to the driving element, a power output structure, a torque multiplying structure including a sun gear, a carrier connected to the output structure, planet pinions on the carrier and an orbit gear connected to the driven element, a fluid pressure actuated unit automatically operative at a predetermined speed of operation of the transmission to lock together the sun gear and the orbit gear of the power splitting differential, a fluid pressure actuated unit associated with the torque multiplying structure automatically operative to release the reaction element simultaneously with the locking together of the sun and orbit gears of the power splitting differential, and a fluid pressure actuated unit automatically operative at an increased speed to lock together the sun gear and the carrier of the planet pinions of the torque multiplying structure so as to provide for direct drive.

7. A variable speed transmission comprising power input and output structures, cooperative driving, driven and reaction elements, a power splitting differential connecting the input structure to the driving and driven elements, a torque multiplying structure connecting the driven element to the output structure, a fluid pressure actuated unit for control of the power splitting differential operative to lock the differenial at a predetermined speed, a fluid pressure actuated unit associated with the torque multiplying structure for control of the reaction element operative to lock the reaction element to the torque multiplying structure simultaneously with the locking of the power splitting differential, a fluid pressure actuated brake for the torque multiplying structure, and a fluid pressure actuated unit for locking the power multiplying structure upon attaining a one-to-one ratio drive of the input and output structures.

8. A variable speed transmission comprising a power input structure, a fluid torque converter including cooperative impeller, turbine and reaction elements, a power splitting differential connecting the power input structure to the impeller and the turbine, a fluid pressure actuated unit for locking the power splitting structure, an output structure, a torque multiplying structure connecting the turbine to the output structure, a fluid pressure actuated unit for locking the reaction element to one element of the torque multiplying unit, and a fluid actuated brake for holding the same element.

RAYMOND J. MILLER.
CURT H. GARMAGER.
GORDON E. WHELPLEY.

REFERENCES CITED

The following references are of record in the file of this patent:

UNITED STATES PATENTS

| Number | Name | Date |
|---|---|---|
| 2,235,370 | Jandasek | Mar. 18, 1941 |
| 2,301,451 | Pollard | Nov. 10, 1942 |
| 2,312,849 | Pollard | Mar. 2, 1943 |
| 2,317,498 | Tipton | Apr. 27, 1943 |
| 2,402,164 | Kelbel | June 18, 1946 |
| 2,407,289 | LaBrie | Sept. 10, 1946 |
| 2,414,359 | Carnagua | Jan. 14, 1947 |